United States Patent [19]
Davey

[11] Patent Number: 5,134,801
[45] Date of Patent: Aug. 4, 1992

[54] FISHING AID

[76] Inventor: Brian I. Davey, 278 Barbat Road, Rynfield, Benoni, Transvaal, South Africa

[21] Appl. No.: 629,374

[22] Filed: Dec. 18, 1990

[30] Foreign Application Priority Data

Dec. 19, 1989 [ZA] South Africa .................. 89/9706

[51] Int. Cl.⁵ ............................................. A01K 85/00
[52] U.S. Cl. .................................. 43/42.28; 43/42.06; 43/44.8; 43/44.2; 43/42.39; 43/42.29
[58] Field of Search ............... 43/44.2, 42.28, 42.06, 43/42.39, 44.6, 44.8, 42.32, 42.29, 42.3

[56] References Cited

U.S. PATENT DOCUMENTS

| | | | |
|---|---|---|---|
| 3,293,790 | 12/1966 | Konomos | 43/44.2 |
| 3,971,152 | 7/1976 | Husson | 43/42.32 |
| 4,367,607 | 1/1983 | Hedman | 43/44.8 |
| 4,751,789 | 6/1988 | Devereaux | 43/42.28 |
| 4,777,757 | 10/1988 | de Marees van Swinderen | 43/42.06 |
| 4,790,100 | 12/1988 | Green | 43/42.28 |
| 4,796,376 | 1/1989 | Schlaegel | 43/44.6 |
| 4,858,367 | 8/1989 | Rabideau | 43/42.39 |
| 4,875,305 | 10/1989 | Bridges | 43/42.06 |
| 4,920,688 | 5/1990 | Devereaux | 43/42.28 |
| 4,964,234 | 10/1990 | Davey | 43/44.2 |
| 5,094,026 | 3/1992 | Correll et al. | 43/42.28 |

Primary Examiner—Kurt Rowan
Attorney, Agent, or Firm—Marshall & Melhorn

[57] ABSTRACT

The fishing aid has a component which is towed through the water in use. Hooks are provided on the component for engaging a dead bait fish or a strip of bait. The hooks are so designed that the bait assumes an upright, natural attitude during towing. A protective skirt is provided which embraces the bait and minimizes the tearing effect of the water as the device is towed. Water impinging on the device during towing causes it to flutter from side to side with attendant lifelike motions of the skirt and bait.

19 Claims, 6 Drawing Sheets

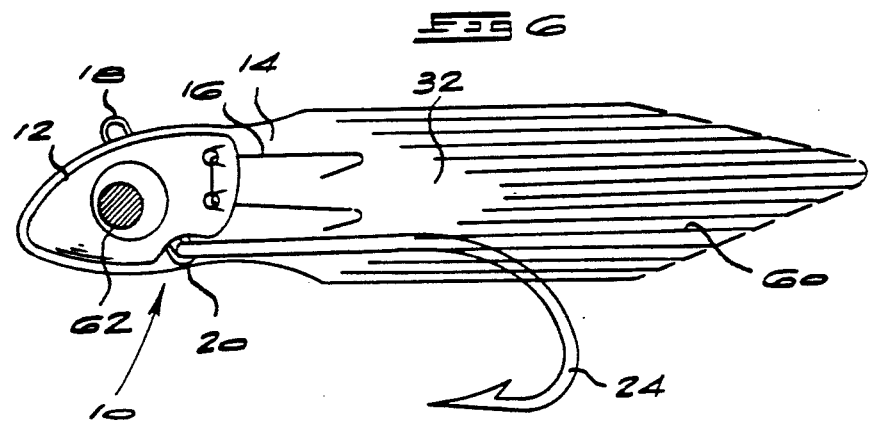
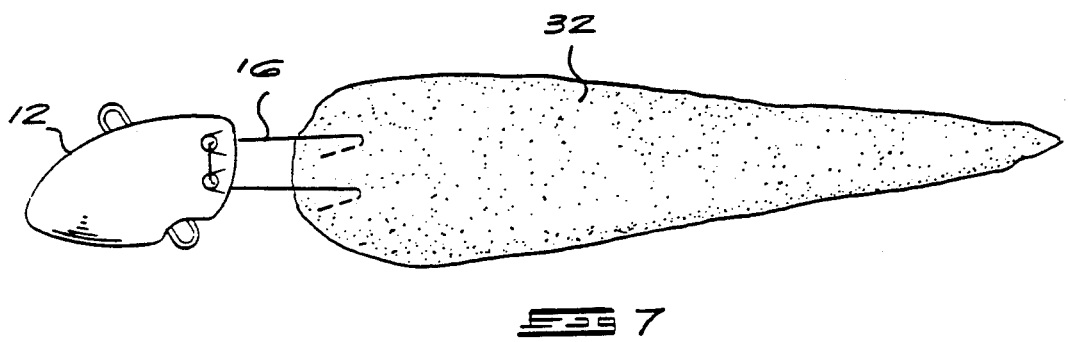
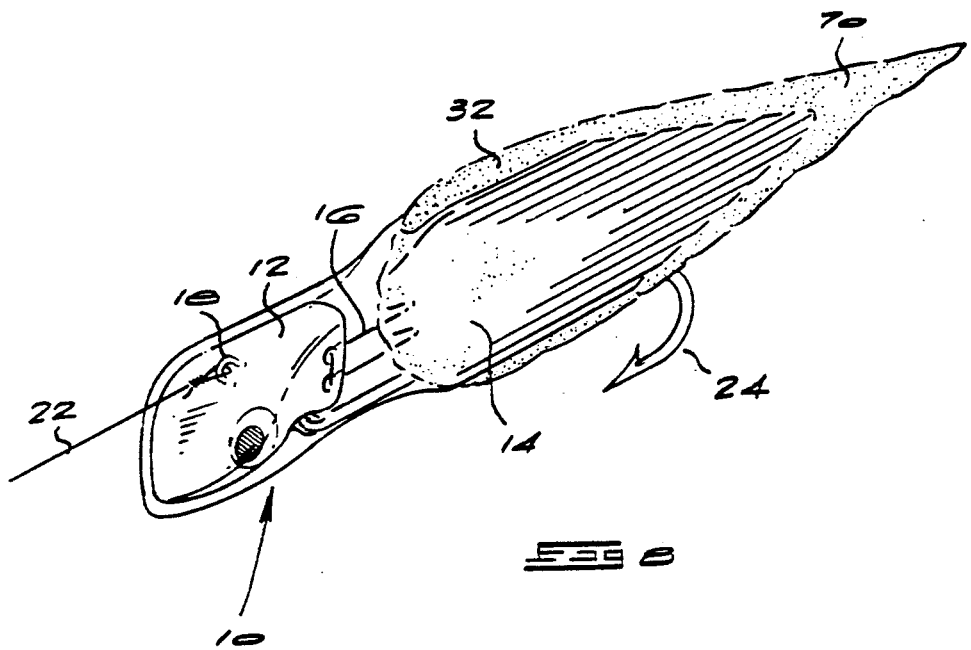

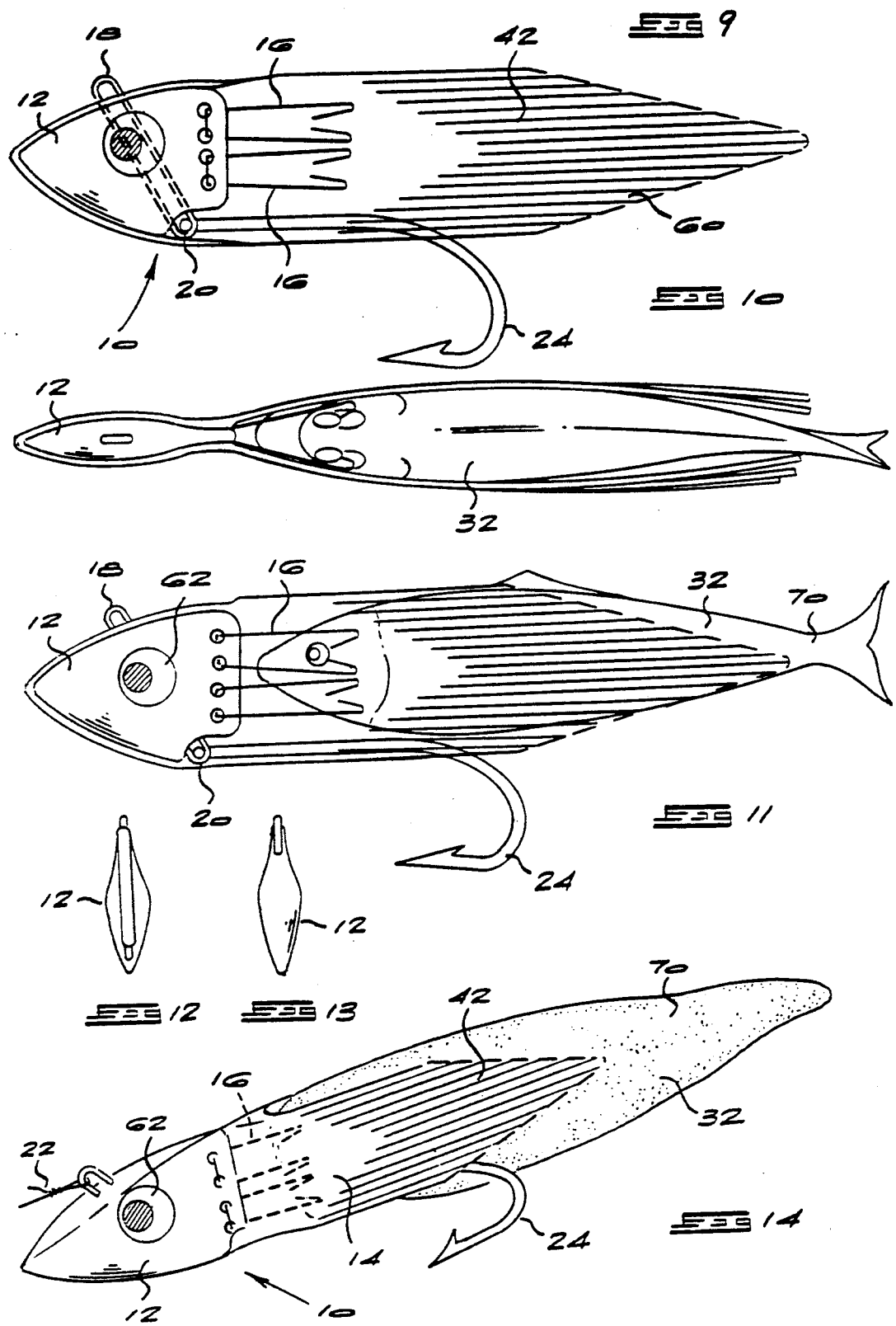

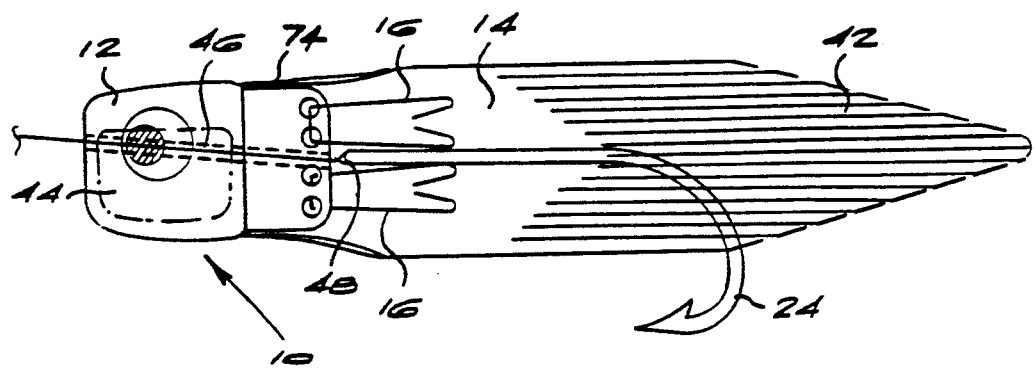
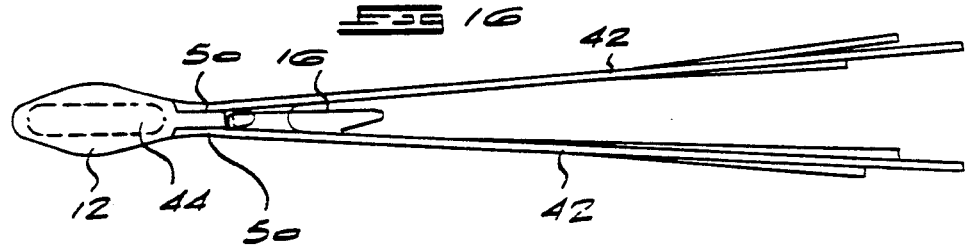
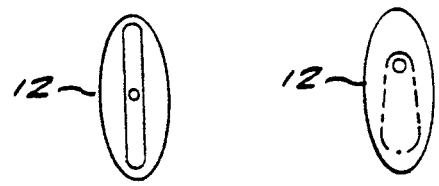
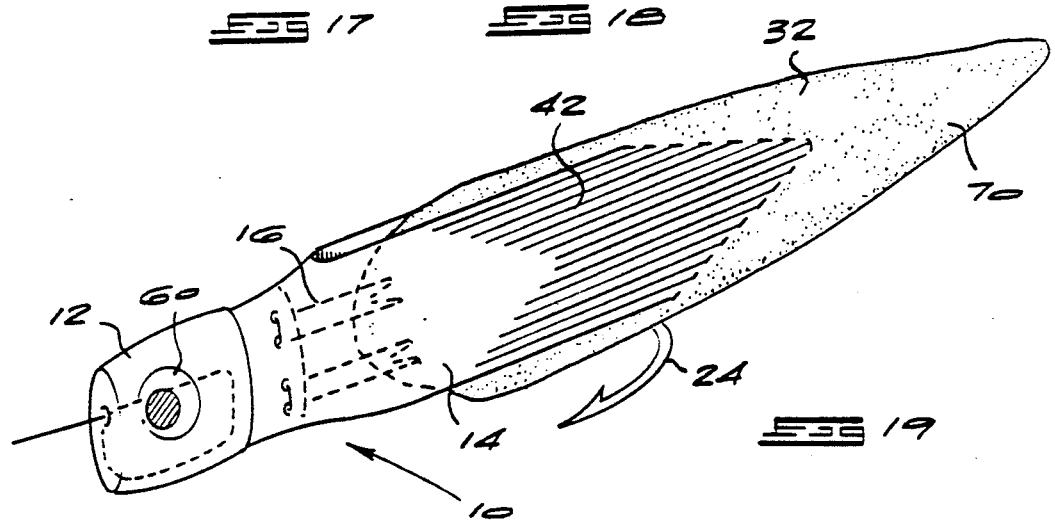

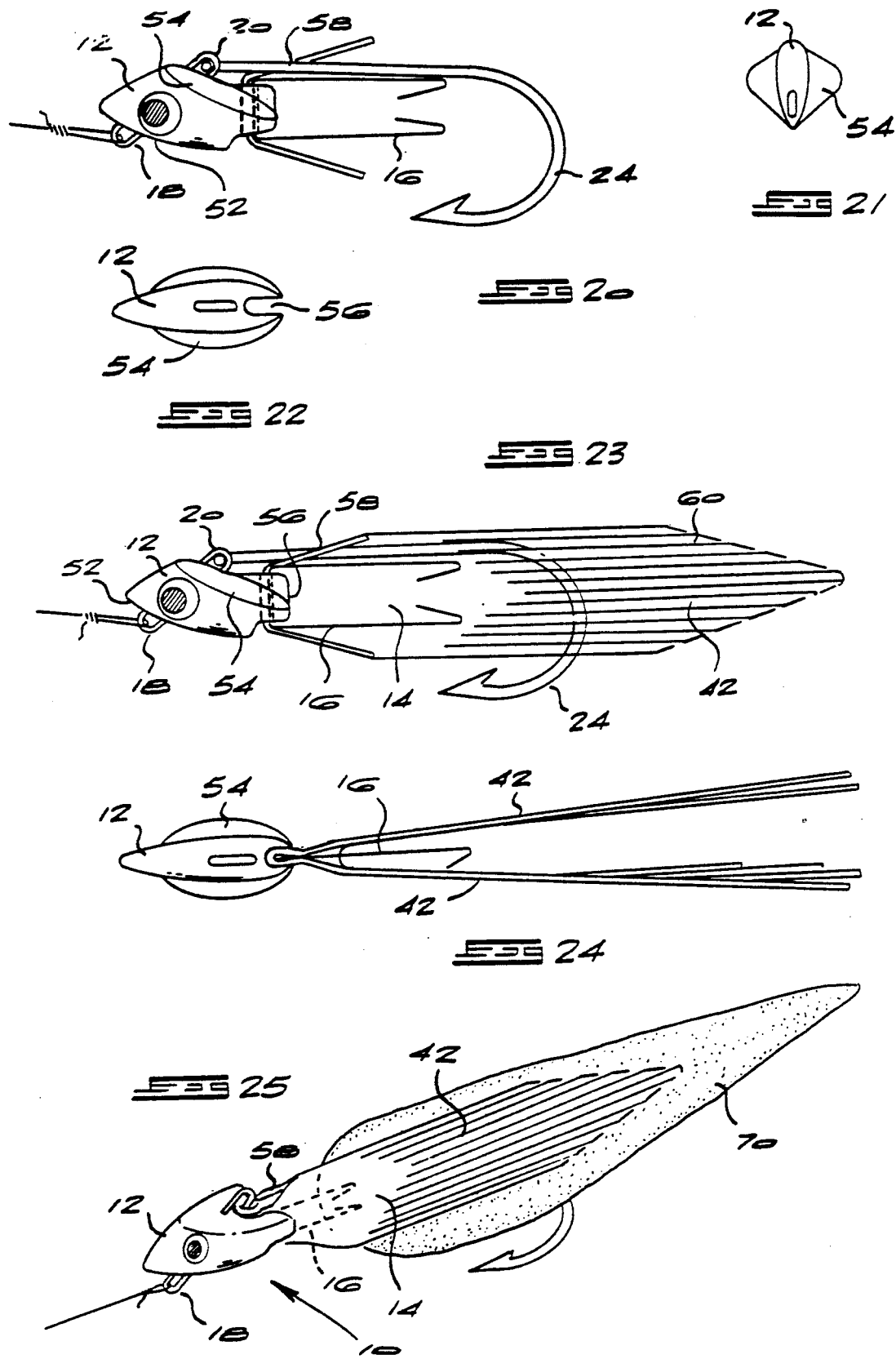

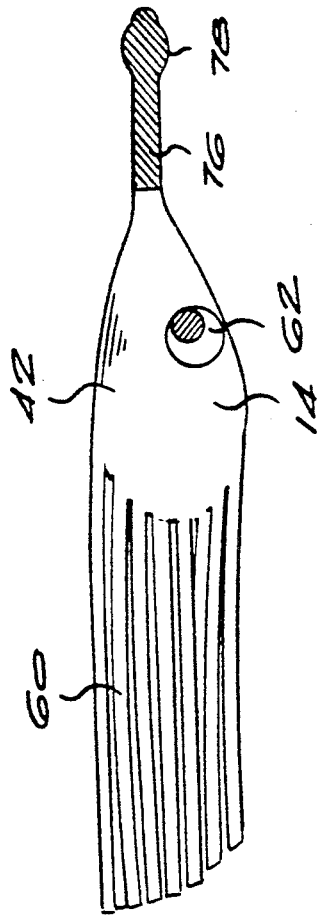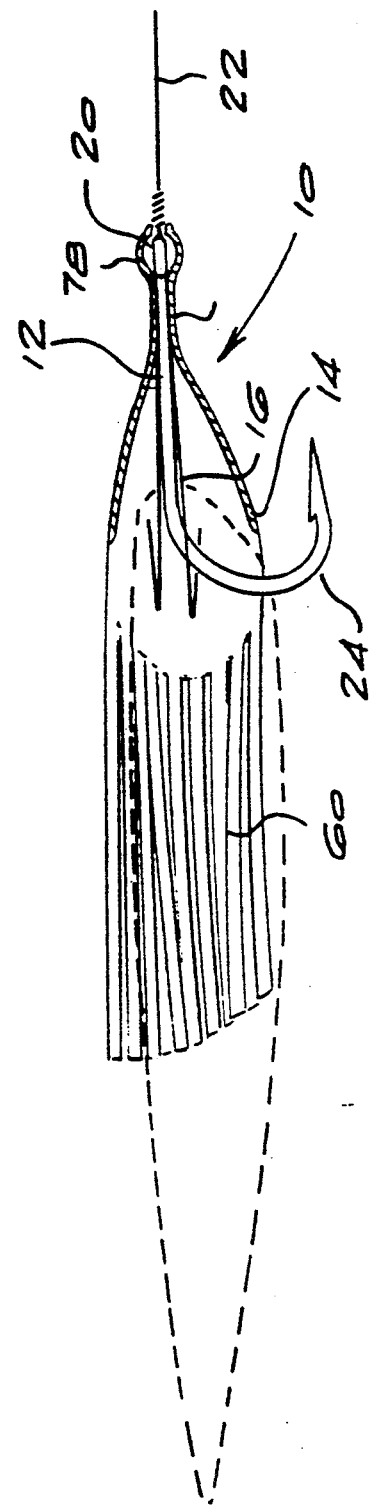

FISHING AID

BACKGROUND TO THE INVENTION

This invention relates to a fishing aid.

It is generally recognised that the best form of bait for certain species of predator or game fish is live bait. However, it is not always easy to acquire live bait so as less preferred options, some fishermen use dead or artificial bait.

However, these options do suffer drawbacks in that dead fish do not swim like live bait which swim with their dorsal fin vertical, and artificial bait does not have a natural smell.

In an attempt to overcome these disadvantages, various "bait swimmers" have been designed which impart a more realistic "swimming" action to the dead fish. Cut strips of dead fish, commonly known as "strip bait", have been used to intensify the smell and taste of the bait.

However, these methods do not protect the bait fish or strip as it is being trolled through the water with the result that at reasonable trolling speeds the bait breaks up within a short time. This problem is even greater when fishing hooks are attached in place next to or through the bait as this often weakens the bait to a point where it offers little resistance to the tearing effect of the water when the bait is being trolled at high speeds.

Further, dead or strip bait obviously does not undergo a slight colour change which occurs in certain species of fish when attacked. Certain species of fish have a lateral line running along the length of the body which apparently changes colour or "lights up" whenever the fish is alarmed. The predator fish apparently recognises this "lighting up" as fear which it is believed incites the predator fish to strike.

The invention seeks to provide protection to the dead or strip bait as it is being trolled, as well as to improve the smell and overall appearance of the bait.

SUMMARY OF THE INVENTION

According to a first aspect of the invention, there is provided a fishing aid comprising:
 a) a component adapted to be towed through water by a towing line,
 b) means on the component for securing bait to the component so that the bait is towed behind the component when the component is towed through the water, and
 c) a protective skirt which is attachable to the component and which comprises operatively rearwardly extending side flaps for at least partially enveloping the flanks of the bait and for protecting the bait against the tearing effect of the water during towing, wherein the component and bait securing means are arranged to ensure that the bait assumes a natural upright attitude and is caused to weave in the manner of a live, swimming fish during towing. The component may be a moulded body of dense material.

The skirt may be provided with a cavity into which the body is receivable, or may comprise an annulus which is attachable to the body, with the skirt in each case comprising two flaps which in use extend rearwardly from the annulus or cavity to straddle and engage the flanks of the bait.

An attachment point may be provided on the body to which the towing line is attachable, or a hole may be formed in the body to allow the towing line to be passed therethrough to be attached to a fish hook.

Preferably, the body has a bulbous nose portion and a thinner rear portion to which the bait securing means may be attached, and the balance of the body may be such that when the body is suspended from a line attached to the attachment point the rear of the body is substantially vertical.

The bait securing means are preferably constituted by at least one hook mounted pivotally to the body so that the bait is free to pivot about an operatively upright axis when the fishing aid is towed through water.

According to further aspects of the invention, the skirt may be provided with light-reflective material and representations of eyes may be provided in the skirt or on the body. The rearward edges of the skirt may also be formed into tassels and the skirt may contain an ingredient such as aromatic organic oil or cod liver oil, to endow the fishing aid with a fishy smell.

Alternatively, the component may be constituted by a fish hook, in which case the skirt may be provided with a cavity for receiving the eye of the fish hook, the skirt having two side flaps which in use extend rearwardly to engage the flanks of the bait during tearing.

The skirt may also be provided with an operatively forwardly extending snout portion. The snout portion may be substantially tubular with the cavity being provided in the snout portion.

According to a second aspect of the invention, there is provided a skirt for a fishing aid which has a component adapted to be towed through the water by a towing line and means on the component for securing bait thereto, wherein the skirt is attachable to the component and comprises operatively rearwardly extending side flaps for at least partially enveloping the flanks of the bait on the bait securing means and thereby for protecting the bait from the tearing effect of the water through which the aid is towed.

BRIEF DESCRIPTION OF THE DRAWINGS

The invention will now be described in more detail, by way of example only, with reference to the accompanying drawings in which:

FIG. 6 shows a side view of the fishing aid with the body inserted in place in the skirt;

FIG. 7 shows a side view of a bait strip secured to the bait securing means on the body of the fishing aid, with the protective skirt omitted;

FIG. 8 shows a pictorial view of the fishing aid ready for use;

FIG. 9 shows a side view of a second embodiment of the invention;

FIG. 10 shows a top view of the fishing aid shown in FIG. 9;

FIG. 11 shows a side view of the fishing aid shown in FIG. 10;

FIGS. 12 and 13 show rear and front views respectively of the body of the fishing aid shown in FIGS. 9 to 11;

FIG. 14 shows a pictorial view of this embodiment of the fishing aid with a bait strip in place as opposed to dead bait;

FIG. 15 shows a side view of a third embodiment of the invention;

FIG. 16 shows a sectional view of the fishing aid shown in FIG. 15;

FIGS. 17 and 18 show rear and front views respectively of the body of the fishing aid of FIGS. 15 and 16;

FIG. 19 shows a pictorial view of the fishing aid of FIGS. 15 and 16 in use;

FIG. 20 shows a side view of a fourth embodiment of the invention with the skirt not shown;

FIG. 21 shows a front view of the body of the fishing aid shown in FIG. 20;

FIG. 22 shows a top view of the body shown in FIG. 21 prior to the skirt and bait securing hook being crimped in place;

FIG. 23 shows a side view of the fishing aid shown in FIG. 20 with the skirt in place;

FIG. 24 shows a top view of the fishing aid in FIG. 23, but without the fishing hook;

FIG. 25 shows a pictorial view of the fourth embodiment of the invention in use;

FIG. 27 shows a side view of a skirt of a fifth embodiment of the invention; and FIG. 28 shows a cross-sectional view of this embodiment of the invention with a fishing hook in place inside the skirt.

DESCRIPTION OF PREFERRED EMBODIMENTS

Figures 1, 2:
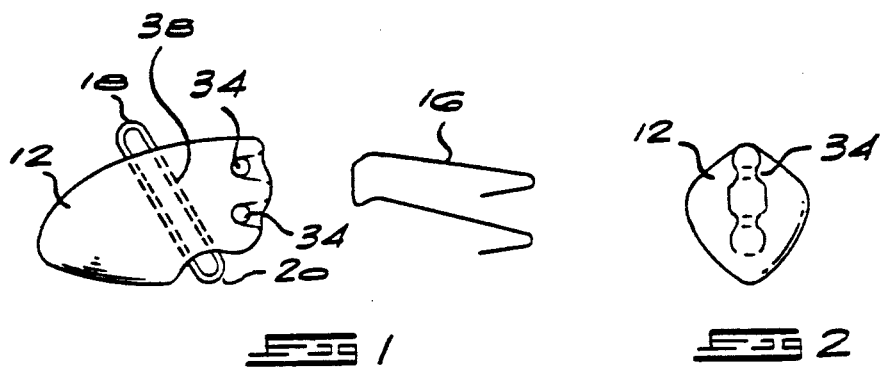
FIG. 1 shows a side view of the body and bait securing means of fishing aid according to the invention.
FIG. 2 shows a rear view of the body shown in FIG. 1.

The fishing aid 10 shown in FIG. 6 includes a component 12, a skirt 14, bait securing means 16 and eyes 18 and 20 for attaching a towing line 22 and a fishing hook 24.

Figure 3:
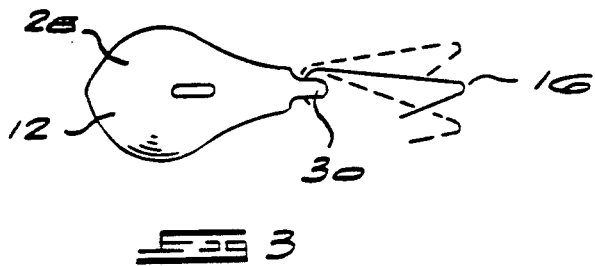
FIG. 3 shows a top of the body shown in FIG. 1.

The component 12 in FIGS. 1 to 3, 6 to 8, 9 to 14, 15 to 19 and 20 to 25 is shown as a moulded body 12 of dense material, by which is meant that the body may be made of lead alloy or any other suitable material. As can most clearly be seen in FIGS. 1 to 3, the body tapers from a bulbous nose portion 28 towards its rear. Bait 32, which may be either dead bait or bait strips, may be attached to the body 12 by bait securing means which in this case are constituted by a hook 16 which is passed through eyes formed in the thinner rear portion 36 of the body.

It will be appreciated that this method of attachment of the bait hook 16 to the body will allow the bait to wobble or flutter horizontally relative to the body during towing, about a substantially upright axis. This ensures that the bait does not sag downwardly behind the body in a lifeless manner.

The towing eye 18 and fish hook eye 20 are formed by a length of wire 38 (shown by dashed lines in FIG. 1) cast into the body 12. The towing eye 18 is carefully positioned on the body 12 such that if the body 12 is suspended on the towing eye 18, the head will balance with the rear portion 30 more or less vertical. This is an important feature of the invention and ensures a lifelike orientation of to the fishing aid as it is being towed through the water.

Figure 4:
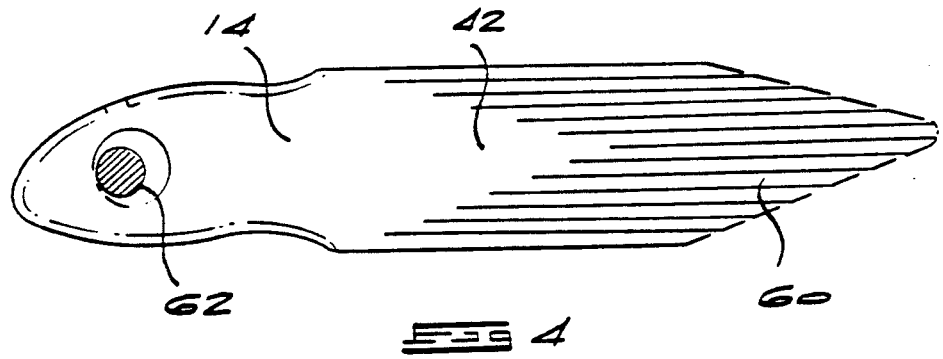
FIG. 4 shows a side view of a skirt of the fishing aid according to the invention.
Figure 5:
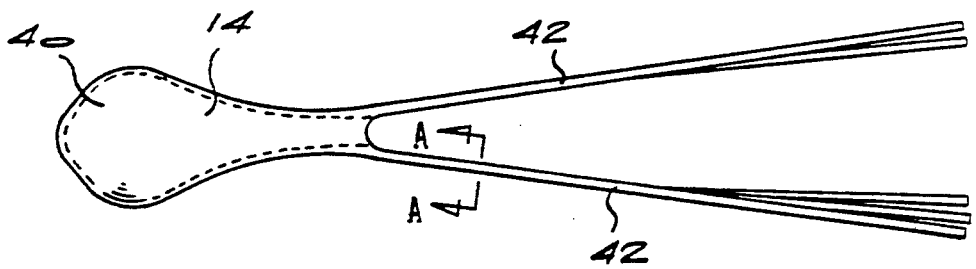
FIG. 5 shows a top view of the skirt shown in FIG. 4.

The protective skirt 14 for this version of the fishing aid is shown in FIGS. 4 and 5. The skirt is a further important feature of the invention and serves the dual purpose of maintaining the integrity of the bait and reducing the tearing effect on the bait 32 as it is being towed through the water.

In this embodiment, the skirt is moulded to provide an internal cavity 40 into which the body 12 may be inserted. As may most clearly be seen in FIG. 5, soft, flexible flaps 42 extend rearwardly from the frontal cavity portion, and in use straddle the bait 32 which is attached to the bait securing hook 16.

As can best be seen in FIG. 8, the flaps lie alongside the bait and protect the bait from the tearing effect of the water through which the fishing aid 10 is being towed. The two flaps or sides of the skirt 14 then trail naturally behind the body 12 of the fishing aid 10 on either side of the bait. As may be see in the drawings the rearward edges of the skirt are formed into tassels.

As the fishing aid 10 is towed forwardly through the water, water is forced to flow over and around the bulbous nose portion 28 of the body 12 and along the trailing flaps 42. This flow of water presses the flaps together to apply a clamping force which holds the bait in place.

The clamping force which is exerted on the two side flaps increases as the speed at which the fishing aid is towed through the water increases. Thus, as the speed increases, the force with which the bait is held by the flaps increases. Thus, in this manner, the tearing or pulling effect of the bait hook through the bait 32 is reduced.

With the fishing aid 10 trolled behind a boat using the towing line 22, the dead bait or the bait strip 32 trails behind the body 12 at a natural, upright attitude as shown in FIG. 8. As the fishing aid is trolled through the water, slight pressure imbalances acting on the body 12 cause the body to rock slightly from side to side. This rocking motion is amplified rearwardly to create a weaving motion in the trailing flaps 42 which in turn causes the bait 32 to weave in the manner of a live fish. The overall flexural movement is akin to that of a live, swimming fish.

To improve the chances of catching a fish, it is desirable to have fishing aids which are able to dive deeply or to swim at or just under the surface of the water and at a variety of speeds. There are thus distinct advantages in designing the head in different forms to provide greater options to the fisherman.

FIGS. 9 and 14 show a second embodiment of the invention and like numerals are used to denote like parts. This version is used when higher trolling speeds are required.

The fishing aid 10 again comprises a body 12, a protective skirt 14, bait securing means 16 and eyes 18 and 20 for attaching a towing line 22 and a fishing hook 24.

However, as shown in FIGS. 12 and 13, in this version the body is of a more streamlined shape.

Two bait securing hooks are 16 are provided and can most clearly be seen in FIG. 10, are engaged with the flanks on each side of the bait 32, which in FIGS. 10 and 11 is shown as a dead bait fish, and in FIG. 14 is shown as a bait strip.

FIGS. 15 to 19 show a third version of the fishing aid 10 which may be used at slower trolling speeds. Again, like numerals are used to denote like parts. In this version, greater stability must be given to the body 12 of the fishing aid, and balance and weight distribution become more important. The body 12 is again of a more streamlined shape, but in this case is cast from a clear plastic. As indicated by dashed lines in FIG. 15, 18 and 19, a weight 44 is cast into the body 12. A substantial part of the weight hangs below the towing line 22, which in this case passes through a hole 46 formed in the body 12 to be tied to the fishing hook 24 at 48. The weight 44 acts as a stabiliser and keeps the body 12 vertical as it is being towed through the water. The bait 32 is thus maintained in an upright, natural attitude, as shown in FIG. 19.

In this embodiment, two side flaps 42 of the skirt 14 extend rearwardly from portion 74 extending from the body 12. This can most clearly be seen at 50 in FIG. 16. Two bait securing hooks 16 are provided to secure the bait to the body 12.

Bait fish are often chased to the surface by predator or game fish. They swim at or just under the surface of the water, and in an attempt to get away often break out of the surface of the water. In this condition they become easy prey for the predator or game fish.

A fourth embodiment of the invention is shown in FIGS. 20 to 25. This version is designed to swim at or just under the surface of the water. As can clearly be seen in the drawings, the towing eye 18 is now positioned underneath the body 12, with the result that as the fishing aid 10 is being towed through the water, the force of the water acting on the upwardly sloping water impingement surface 52 of the body 12 causes the aid to proceed to and stay at the surface of the water. The body is also provided with a pair of ailerons 54 which are moulded integrally with the body 12. The ailerons 54 assist the fishing aid 10 in reaching the surface and provide stability to the body once it has reached the surface. This ultimately keeps the bait "swimming" in the natural vertical orientation of a live fish.

Referring now to FIG. 22, the skirt 14 and bait securing hook 16 are crimped in place in a concavity or vertical slot 56 provided for them in the rear of the body 12. The fishing hook 24 is attached to an eye 40 which again is formed by a length of wire cast into the body 12. In this version, the bait hook 16 is of a slightly different shape to those used in the previous embodiments. The hook 24 is mounted above and in front of the side flaps 42 with the shank 58 of the hook passing through a small hole in the leading top corner of the skirt 14. The hook 24 is fastened to the eye 20 and is held in place during towing between the side flaps 42.

A fifth embodiment of the invention is now described with reference to FIGS. 27 and 28 of the accompanying drawings. In this case the fishing aid comprises a component 12, a skirt 14 and bait securing means 16. However, the component 12 in this case is constituted by the shank of a fishing hook 24. The hook 24 has an eye 20 for attaching a trace line 22.

The eye 20 is also used to secure bait securing means 16 to the fishing aid 10. The bait securing means in this case is constituted by a hook 16 which is passed through the fish hook eye 20. Bait, which may be either a small dead bait fish or bait strips, may thus be attached to the fishing aid 10 in this way. This version of the fishing aid is usually used with smaller sized bait.

The skirt 14 is shown in FIGS. 27 and 28 as having an operatively forwardly extending snout portion 76. This portion is provided with an enlarged section or cavity 78 which in use receives the eye 20 of the fishing hook 24. As the fishing aid 10 is trolled through water the fishing hook 24 acts as a keel which keeps the aid and bait "swimming" in the natural vertical orientation of a live fish.

Other features of the invention are now described which it is believed make the overall appearance of the fishing aid more attractive to predator fish.

The body of the first four versions of the aid and the skirt of all the versions of the illustrated fishing aid are coloured in any one of a variety of colours, or mixtures of colours, which are considered attractive to game fish. The colourant which is used may contain a reflective component. The importance of providing a fishing aid in various colours is explained later on.

In all five versions of the fishing aid the trailing edges of the skirt are formed into tassels 60. It is believed that the flexible tassels may add to the appeal of the aid to some predator fish.

It is generally acknowledged by fishermen that artificial lures which may be painted in a variety of colours will produce different shades of those colours depending on the fishing conditions and the depth at which the lure is being towed. The correct choice of lure colour and the optimum depth at which to troll depends to a large degree on the skill of the angler.

The skirt 14 may be made of clear material containing the chosen colourant(s) and reflective particles. In addition, a lateral line may be coloured into the material which runs down both sides of the side flaps 42 into the tassels 60.

The importance of a reflective component resides in the fact that fish are known to have a so-called "lateral line" which causes a marginal change in the fish's colour if the fish, for instance, feels terror as a result of the impending attack of a predator fish. This marginal change in colour is seen by the predator fish and indicates to it which is a suitable fish to attack. It is believed that with a reflective component in the skirt 14 of the fishing aid 10, light falling on the body 12 will create a shimmering or flashing effect which will be seen by a predator fish as a marginal change in colour due to the action of the target fish's lateral line.

Eyes 62 may be coloured into the material on either side of the skirt in the vicinity of the bulbous portion of the body, or may be painted on the body. The eyes in some embodiments have forward looking pupils to give the impression that the predator fish is not being watched and the sclera are coloured yellow. It is believed that the provision of eyes on the skirt could help in persuading a predator fish that the baited fishing aid is a live fish. It is known that predator fish generally attack from behind and often strike at or near the region of the eye.

Figure 26:
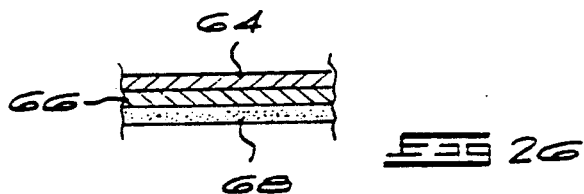
FIG. 26 shows a cross-sectional view of a side flap of the skirt at the line A—A in FIG. 5.

The skirt, flaps and tassels may be moulded, cast or cut from any flexible material such as Latex or PVC, in any of the preferred designs. An enlargement of cross section A—A in FIG. 26 shows that the skirt flaps and tassels consist of at least three coats or layers. The innermost layer 64 is a base coat or layer, the next layer 66 constitutes the colour coat, and the outer layer 68 constitutes a final clear coat.

In an attempt to imbue the fishing aid with a more natural smell, the layer 68 may contain fish oil. Preferably, cod liver oil or any selected aromatic organic oil is used as part of the plasticiser in the moulding process. This effectively captures a fishy smell into the plastic material as it is being cured.

Alternatively, if the skirt, flaps and tassels are injection moulded, the aromatic organic oil or cod liver oil can be injected into the moulds prior to moulding, or mixed into the plastic material as a plasticiser prior to injection moulding.

The intensity of the smell can be better maintained if the fishing aid is vacuum packed or kept in a sealed container.

When the first four versions of the fishing aid are to be prepared for use, the soft, flexible flaps 42 are peeled back, exposing the bait securing hook or hooks 16. The bait 32 is then secured to the hooks 16 as indicated in FIGS. 8, 14, 19, 25 and 28. The flaps 42 are allowed to close and are then smoothed over the flanks of the dead bait or bait strip 32 to leave a portion of the bait 70 extending rearwardly from the skirt. The aid may then be tossed overboard to commence trolling.

The fifth version of the fishing aid is prepared for use in a slightly different way. The fishing hook 24 is secured to a suitable length of trace line 22. The bait securing means 16 are then threaded through the eye 20 of the hook 24. The free end of the trace line 22 is then inserted from the rear of the skirt into the forwardly extending snout portion 76 of the aid to puncture the end of the snout portion 76 of the aid. The fishing hook 24 is then pulled into the skirt 14 until the fish hook eye 20 locates in the cavity 78 provided in the snout portion. At this stage the shank of the hook 24 is concealed by the tubular snout portion 76. Bait may then be secured to the bait securing means as described above.

At speed, the rocking motion of the aid imparts a weaving, flexural movement to the bait, while the balance of the aid ensures an upright, natural attitude. The colour and smell of the skirt adds to the overall impression of a live, swimming fish.

The flaps 42 hold the bait 32 in place, while permitting it to weave from side to side behind the body as a result of the way in which the bait securing hooks 16 are attached to the component 12. The flaps conceal the shanks of the bait and fishing hooks which adds to the overall impression of the fishing aid.

Depending on the size of the fishing aid, it is obviously possible to use a dead fish as bait as well as bait strip. If a dead fish is used, the side flaps serve another function in that they close the dead fish's gills and prevent the dead fish from bloating as the fish is being towed. At the same time, the gill flaps allow the dark colour of the back and the shiny belly of the bait fish to protrude from the flaps, which is considered to be a more attractive feature to the predator fish.

I claim:
1. A fishing aid comprising:
   a) a component adapted to be towed through the water by a towing line;
   b) hook means for catching fish pivotally mounted to said component;
   c) bait securing means articulated to said component through eyes formed in the rear portion of said component, and being independent of said hook means for securing bait to said component so that the bait is towed behind said component when said component is towed through the water; and
   d) a protective skirt attached to said component, said protective skirt comprising operationally rearwardly extending side flaps for at least partially enveloping the flanks of the bait and for protecting the bait against the tearing effect of the water during towing, wherein said component and said bait securing means are arranged to ensure that the bait assumes a natural upright attitude and is caused to weave in the manner of a live swimming fish during towing.

2. A fishing aid according to claim 1, wherein the component is a moulded body of dense material.

3. A fishing aid according to claim 2 wherein the skirt is provided with a cavity for receiving the body, the skirt having two side flaps which in use extend rearwardly to engage the flanks of the bait during towing.

4. A fishing aid according to claim 2, wherein the skirt comprises an annulus which is attachable to the body and two side flaps which in use extend rearwardly from the annulus to engage the flanks of the bait.

5. A fishing aid according to claim 2, wherein an attachment point is provided on the body to which the towing line is attachable.

6. A fishing aid according to claim 5, wherein the balance of the body is such that when the body is suspended from a line attached to the attachment point the rear of the body is substantially vertical.

7. A fishing aid according to claim 1, wherein the bait securing means includes hook means.

8. A fishing aid according to claim 2, wherein the body has a bulbous nose portion and a thinner rear portion to which the bait securing means is attached.

9. A fishing aid according to claim 8, wherein the bait securing means comprises at least one hook mounted pivotally to the rear portion of the body so that the bait can pivot about an operatively upright axis when the fishing aid is towed through water.

10. A fishing aid according to claim 2, wherein representations of eyes are provided on the body.

11. A fishing aid according to claim 2, wherein the dense material is a lead alloy.

12. A fishing aid according to claim 1, wherein the component is constituted by a fishing hook.

13. A fishing aid according to claim 12, wherein the skirt is provided with a cavity for receiving the eye of the fishing hook, the skirt having two side flaps which in use extend rearwardly to engage the flanks of the bait during towing.

14. A fishing aid according to claim 12, wherein the skirt is provided with an operatively forwardly extending snout portion.

15. A fishing aid according to claim 14, wherein the snout portion is substantially tubular.

16. A fishing aid according to claim 13, wherein the cavity is provided in the snout portion.

17. A fishing aid according to claim 12, wherein the bait securing means comprises at least one hook mounted pivotally to the eye of the fishing hook so that the bait can pivot about an operatively upright axis when the fishing aid is trolled through water.

18. A fishing aid according to claim 1, wherein representations of eyes are provided on the skirt.

19. A fishing aid according to claim 1, wherein the rearward edges of the side flaps of the skirt are formed into tassels.

* * * * *